(12) United States Patent
Terashima

(10) Patent No.: US 7,645,950 B2
(45) Date of Patent: Jan. 12, 2010

(54) ELECTRONIC APPARATUS HAVING SWITCH CONTACTS

(75) Inventor: Jun Terashima, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 305 days.

(21) Appl. No.: 11/300,719

(22) Filed: Dec. 13, 2005

(65) Prior Publication Data

US 2006/0159448 A1    Jul. 20, 2006

(30) Foreign Application Priority Data

Jan. 18, 2005    (JP) .............................. 2005-010715

(51) Int. Cl.
*H01H 13/70* (2006.01)
(52) U.S. Cl. ...................... 200/5 A; 200/512
(58) Field of Classification Search .................. 200/5 A, 200/5 R, 292, 314, 341, 302.1–302.3, 512–517
See application file for complete search history.

(56) References Cited

U.S. PATENT DOCUMENTS

| 4,246,452 | A | * | 1/1981 | Chandler | ..................... | 200/5 A |
| 4,476,355 | A | * | 10/1984 | Mital | ......................... | 200/5 A |
| 5,313,027 | A | | 5/1994 | Inoue et al. | | |
| 5,912,612 | A | * | 6/1999 | DeVolpi | ....................... | 338/95 |
| 5,952,629 | A | * | 9/1999 | Yoshinaga et al. | ........... | 200/5 A |
| 6,423,918 | B1 | * | 7/2002 | King et al. | .................. | 200/406 |
| 6,437,682 | B1 | * | 8/2002 | Vance | ......................... | 338/185 |
| 6,911,608 | B2 | * | 6/2005 | Levy | ........................... | 200/5 A |
| 7,030,329 | B1 | * | 4/2006 | Sneek et al. | ................ | 200/292 |
| 7,060,924 | B1 | * | 6/2006 | Beene et al. | ................ | 200/512 |
| 7,381,913 | B2 | * | 6/2008 | Sjostrom | ..................... | 200/5 A |
| 2004/0031673 | A1 | * | 2/2004 | Levy | .......................... | 200/521 |

FOREIGN PATENT DOCUMENTS

| JP | 9-214084 A | 8/1997 |
| JP | H10-050171 A | 2/1998 |
| JP | 2003-162946 A | 6/2003 |
| WO | WO 2005045867 A1 * | 5/2005 |

* cited by examiner

*Primary Examiner*—Renee Luebke
*Assistant Examiner*—Marina Fishman
(74) *Attorney, Agent, or Firm*—Canon USA Inc IP Division

(57) ABSTRACT

At least one exemplary embodiment is directed to an electronic apparatus includes a switch contact and a control unit. The switch contact is constituted of a fixed contact and a movable contact. The fixed contact includes a plurality of detection contacts and a common contact. The movable contact can be moved to a contact/noncontact state. The control unit detects a signal generated when all of the contacts in the fixed contact are simultaneously made conductive by contact of the movable contact.

6 Claims, 12 Drawing Sheets

ELECTRONIC APPARATUS HAVING SWITCH CONTACTS

BACKGROUND OF THE INVENTION

1. Field of the Invention

The present invention relates to an electronic apparatus which generates a switch signal, more particularly, though not exclusively, an imaging device which generates a switch signal using a conductive detection and common contact.

2. Description of the Related Art

A switch detection pattern of a conventionally used general tact switch will be described with reference to FIG. 9. In FIG. 9, reference numeral 91 denotes a common (GND) contact (line or pattern), and reference numeral 92 denotes a detection contact (line or pattern). Accordingly, one common contact and one detection contact make a pair to constitute a fixed contact, i.e., a switch conductive section. A movable contact of a switch operation member is operated with respect to the fixed contact to electrically interconnect the common and detection contacts, so that a conductive state is set to detect a switch operation. An end surface of the fixed contact is coated with an electrically conductive material such as a metal or carbon. An example of a tact switch is discussed in Japanese Patent Application Laid-Open No. 09-214084.

In recent single-lens reflex or digital still cameras, such tact switches are arranged in four directions, i.e., up-and-down and left-and-right directions, to constitute a direction selector used for selecting a focusing position in a finder screen or for selecting information on a monitor screen.

When the number of pieces of information to be selected are increased, selections alone in the four directions, i.e., the up-and-down and left-and-right directions, are not enough, thus creating a need to increase selectable directions. FIG. 10 illustrates a direction selector configured by annularly arranging the tact switches. Eight switches and one switch are respectively arranged in an outer periphery and in the center. The switches in the outer periphery are arranged at angular intervals of 45° around the switch in the center, and are set as switches to select angular directions and positions.

This switch needs one common contact and nine detection contacts on a circuit. In FIG. 10, nn, ne, ee, se, ss, sw, ww, nw, and cc respectively indicate detection positions of the direction selector. They are arranged in order of an upper part (north), an upper right (north east), a right (east), a lower right (south east), a lower part (south), a lower left (south west), a left (west), an upper left (north west), and a center. Reference numerals 101 to 108 denote detection contacts (lines or patterns) arranged in detection positions in the outer periphery of the direction selector. Reference numeral 109 denotes a detection contact arranged in the center. Reference numeral 100 denotes a common contact (GND) arranged in the respective detection positions to be connected together.

FIG. 11 is a sectional diagram showing a structure of the direction selector, which uses the switch detection pattern shown in FIG. 10. Reference numeral 111 denotes a direction selection member, reference numeral 112 denotes a printed circuit board, and reference numeral 113 denotes a pedestal. The printed circuit board 112 is fixed to the pedestal 113, and the direction selection member 111 is arranged on the printed circuit board 112. Reference numerals 111a, 111b, and 111c denote movable contacts, which can move up and down independently of one another with respect to a pressing operation. Reference numerals 112a, 112b, and 112c denote fixed contacts disposed on the printed circuit board 112, which can contact with the movable contacts 111a, 111b, and 111c, respectively. These fixed contacts are constructed with the conductive pattern shown in FIG. 10.

The direction selector configured as described above can be used in many compact portable electronic apparatuses because of its compact and simple structure. However, when the number of targets to be selected increases, the numbers of switches and directions increase, and the number of switch detection signals increase, thus complicating processing at a signal processing circuit. As a general method of reducing the number of signals to deal with this problem, as shown in FIG. 12, there is a conventional method of alternately thinning the number of contacts, detecting turning-on of switches at two places on both sides adjacent to the thinned place, and detecting turning-on of a switch corresponding to a middle position of the two places, i.e., the contact thinned place, by software.

Numbers and symbols in FIG. 12 are similar to those of FIG. 10. In FIG. 12, fixed contact patterns are not arranged in four places, i.e., an upper right (north east), a lower right (southeast), a lower left (southwest), and an upper left (north west). Signal detection at these omitted portions is determined by conduction of signals at the adjacent two-side positions. For example, in the case of selecting the upper right (north east), pressing is determined when conduction of both of the upper part (north) and the right (east) is detected.

Additionally, there has been proposed a technology of detecting a position and a direction more minutely by using a pointing device operable to change a resistance value of a contact in an analog fashion for a position or direction selector (a selector such as a mouse). An example of such a technology is discussed in Japanese Patent Application Laid-Open No. 2003-162946.

However, according to the aforementioned detection method, accurate direction selection may be difficult, or an erroneous operation may be induced. For example, to directly select a middle position or direction, switches at two places must be simultaneously operated. In practice, the simultaneous operation of the switches at two places is difficult. One of the switches is always operated first, and then the other switch is operated, causing a time difference or order in operation. In consequence, a problem arises in that an intended direction cannot be selected at once when the operation of the middle position is carried out.

Description will be made more specifically with reference to a finder screen illustrated in FIG. 13. Reference numerals a1 to g1 denote indicators of focusing points corresponding to the finder screen. In the case of changing an initial set position b2 of a focusing point to an adjacent focusing point c1, both upper and right switches are operated as the focusing point c1 is positioned obliquely right upward with respect to the focusing point b2.

However, as it is impossible to simultaneously operate both the upper and right switches without any time difference, the upper or right switch is detected first. When the upper switch is detected first, a detection order is from the focusing point b1 to the focusing point c1. When the right switch is detected first, as the focusing points c1 and c2 are present on the right with respect to the focusing point b2, a problem arises in that a changing position cannot be established. In consequence, with this switch configuration, a problem occurs when an oblique direction is selected.

Furthermore, when a pointing device operable to change a resistance value of a contact in an analog fashion is used, an expensive AD converter, complex in circuit processing, must be mounted. Thus, it is difficult to use such a pointing device for a compact portable electronic apparatus because of its size and cost.

SUMMARY OF THE INVENTION

At least one exemplary embodiment is directed to a more compact electronic apparatus capable of independently detecting inputs to many switches more accurately.

At least one exemplary embodiment is directed to an electronic apparatus which includes a fixed contact including a plurality of detection contacts arranged in an noncontact state from one another and a common contact, a movable contact operable to make conductive all of the plurality of detection contacts and the common contact simultaneously by a user's operation, and a control unit configured to operate in accordance with a switch signal from a switch contact constituted of the fixed contact and the movable contact.

Further features of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments.

DETAILED DESCRIPTION OF THE EMBODIMENTS

Figure 1:
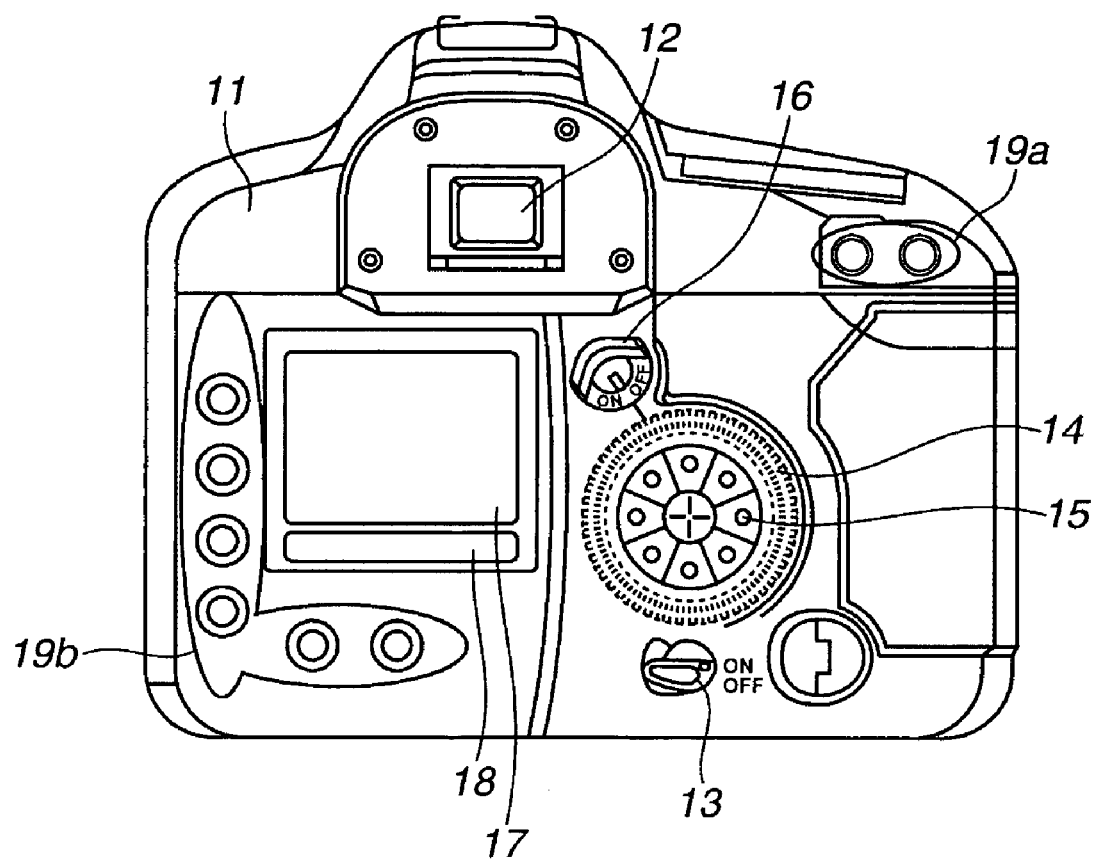
FIG. 1 is a diagram showing a backside of a camera according to an exemplary embodiment.

The following description of exemplary embodiment(s) is/are merely illustrative in nature and is in no way intended to limit the invention, its application, or uses.

Processes, techniques, apparatus, and materials as known by one of ordinary skill in the art may not be discussed in detail but are intended to be part of the enabling description where appropriate. For example, circuit patterns deposited on a substrate may be discussed, however these systems and the methods to fabricate these system as known by one of ordinary skill in the relevant art is intended to be part of the enabling disclosure herein where appropriate.

Note that similar reference numerals and letters refer to similar items in the following figures, and thus once an item is defined in one figure, it may not be discussed for following figures.

Exemplary embodiments will be described in detail below in accordance with the accompanying drawings.

FIG. 1 is a diagram showing an outline of a camera as an example of an electronic apparatus according to an exemplary embodiment.

Reference numeral 11 denotes a camera body, reference numeral 12 denotes an eyepiece section for checking a finder screen, and reference numeral 13 denotes a power switch. Reference numeral 14 denotes an information input dial, which can be operated to set a shutter speed, a diaphragm value, an exposure compensation value, and other camera and optical features as known by one of ordinary skill in the relevant art. Reference numeral 15 denotes a direction selector, which can be operated to select focusing points displayed on the finder screen or a thumbnail image displayed on a monitor 17, or to set information displaying. The direction selector 15 can include one pressing section in the center and eight pressing sections at equal intervals around the center. A configuration of the direction selector 15 will be described in detail below. Note that although the eight pressing sections are discussed in the example provided, exemplary embodiments are not limited to a particular number of pressing sections.

Reference numeral 16 denotes a changeover switch for switching between validity/invalidity of all signals of the information dial 14 and the direction selector 15. Reference numeral 17 denotes a monitor, which can display an image immediately after photographing or an image photographed and recorded in a memory of the camera. Reference numeral 18 denotes an image information display section, which can display photographing-related information regarding an image displayed on the monitor 17. Reference numeral 19a denotes an operation button group (B1) for setting/changing a mode regarding light metering or focus detection. For example, the operation button group (B1) 19a can be operated to change a light metering mode or a focusing point. Reference numeral 19b denotes an operation button group (B2) regarding an image, which can be operated to perform operations such as reproduction/erasure of a photographed image, displaying of an image menu, expansion/reduction, screen movement, and other imaging operations as known by one of ordinary skill in the relevant art and equivalents.

Figure 2:
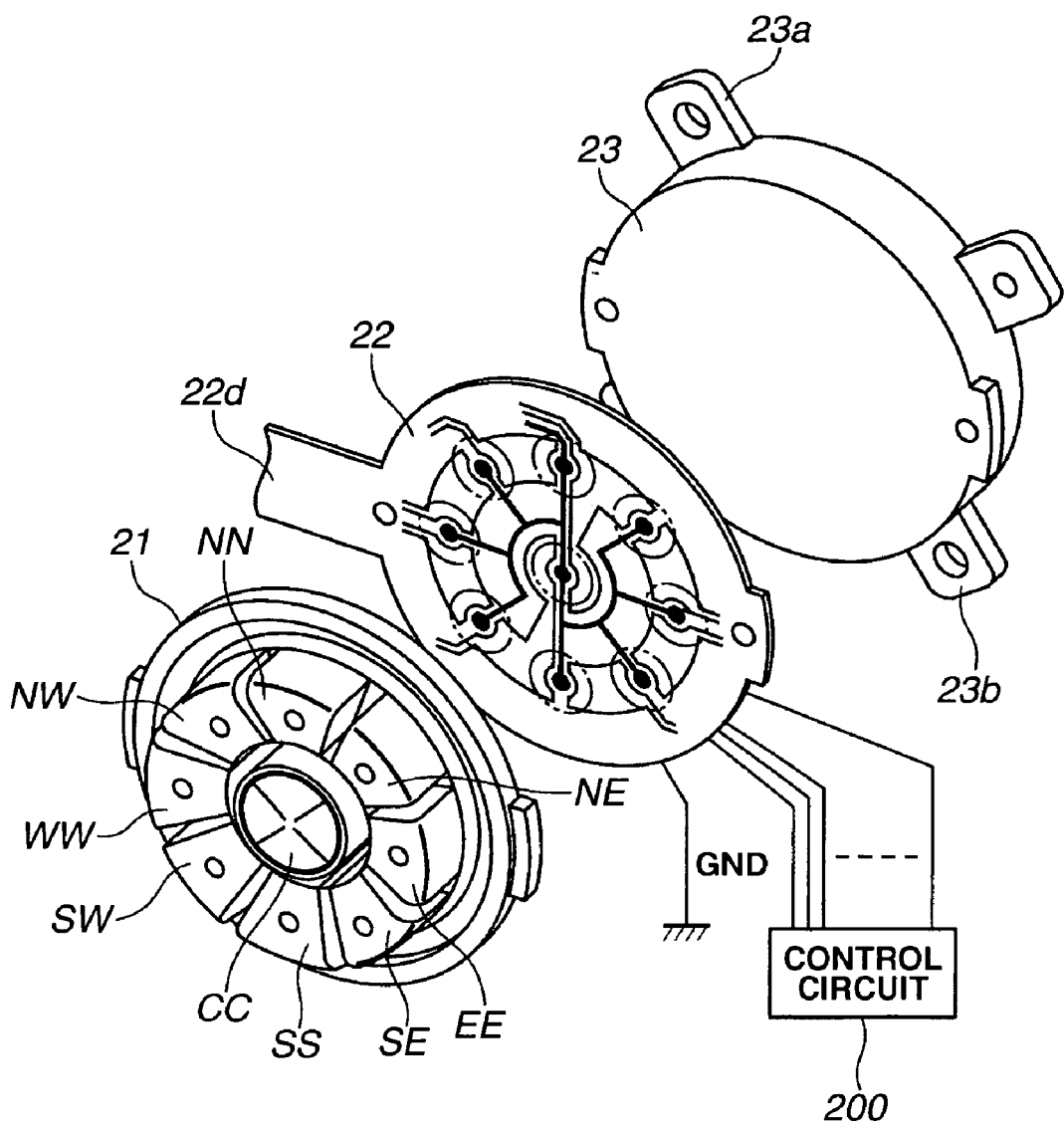
FIG. 2 is an exploded perspective diagram showing a direction selector according to at least one exemplary embodiment.

FIG. 2 is an expanded perspective diagram showing an internal structure of the direction selector 15. Reference numeral 21 denotes a direction selection member including a total of nine independent movable pressing sections, one in the center (CC) and eight around the center (e.g., SS), which can move independently of one another. The direction selection member 21 is an operation member integrally molded of an elastic member and can be self-returned after being pressed. Additional exemplary embodiments can use non-integrally connected pressing sections (e.g., individually molded elastic sections). Operation sections NN, NE, SE, SS, SW, WW, and NW are arranged in directions of an upper part (north), an upper right (north east), a right (east), a lower right (south east), a lower part (south), a lower left (south west), a left (west), and an upper left (north west) in this order (clockwise) to select the respective directions. An operation section CC is arranged in the center and serves as a deciding button operable for deciding a selected direction.

Reference numeral 22 denotes a flexible printed circuit board, on which signal detection patterns are formed in positions facing movable contacts which are conductive members arranged on the back sides of the nine independent movable pressing sections of the direction selection member 21. These signal detection patterns will be described in detail below. Reference numeral 22d denotes a pulling-out section of these signal lines. Reference numeral 23 denotes a pedestal for positioning and fixing the direction selection member 21 and the flexible printed circuit board 22. The pedestal 23 is fixed to a chassis (not shown) in the imaging system (e.g., camera body 11) via fixing sections 23a and 23b at two places. In other exemplary embodiments, the fixing sections can be pieces that screw into the chassis or snapped into the chassis, or fastened in ways known by one of ordinary skill in the relevant art and equivalents.

Reference numeral 200 denotes a control circuit, which detects a signal generated by conduction described below and executes operation control in accordance with the signal.

Figure 3:
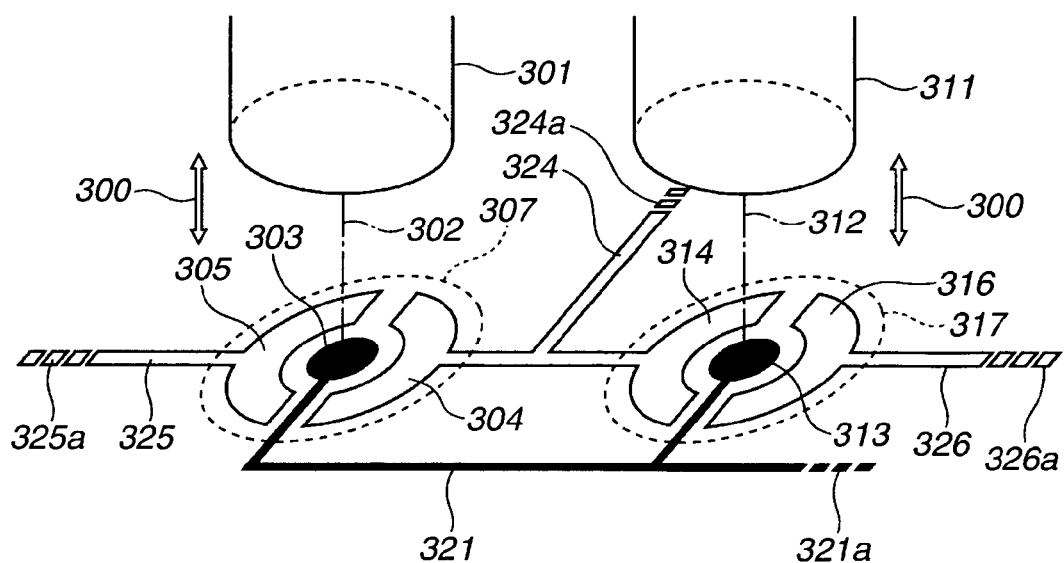
FIG. 3 is a schematic diagram showing a structure of a switch contact according to at least one exemplary embodiment.

FIG. 3 is a schematic diagram showing a structure of a switch contact according to at least one exemplary embodiment. FIG. 3 especially illustrates a case where there are two switch contacts.

Reference numerals 301 and 311 denote movable contacts serving as conductive members, which correspond to the movable pressing sections. The movable contacts 301 and 311 can independently move up and down along center lines 302 and 312 respectively in arrow directions 300 in accordance with a user's pressing operation.

Hereinafter, a switch contact to which the movable contact 301 belongs is referred to as a left contact, and a switch contact to which the movable contact 311 belongs is referred to as a right contact.

Reference numeral 303 denotes a common contact section which belongs to the left contact, and reference numeral 313 denotes a common contact section which belongs to the right contact. The common contact sections 303 and 313 are interconnected and set to the same potential (GND) to constitute a common contact 321. The common contact 321 is connected to the control circuit 200 through an end 321a.

Reference numeral 304 denotes a detection contact section which belongs to the left contact, and reference numeral 314 denotes a detection contact section which belongs to the right contact. The detection contact sections 304 and 314 are arranged in noncontact with the common contact 321. The detection contact sections 304 and 314 are interconnected to constitute a detection contact 324 as one signal line. That is, a detection contact is shared by adjacent switch contacts. In other words, the detection contact 324 belongs to both the left and right contacts. Further, the detection contact 324 is connected to the control circuit 200 through an end 324a.

Reference numeral 305 denotes a detection contact section which belongs to the left contact. The detection contact section 305 is arranged in noncontact with the common contact 321 and the detection contact 324. The detection contact section 305 is connected to another detection contact section (not shown), or is independently arranged, to constitute a detection contact 325. The detection contact 325 is connected to the control circuit 200 through an end 325a.

Reference numeral 316 denotes a detection contact section which belongs to the right contact. The detection contact section 316 is arranged in noncontact with the common contact 321 and the detection contact 324. The detection contact section 316 is connected to another detection contact section (not shown), or is independently arranged, to constitute a detection contact 326. The detection contact 326 is connected to the control circuit 200 through an end 326a.

Reference numeral 307 denotes a fixed contact which belongs to the left contact and which is specifically constituted of the common contact section 303 (and a portion of common contact 321), the detection contact section 304 (and a portion of detection contact 324), and the detection contact section 305 (and a portion of detection contact 325). In other words, the fixed contact 307 is constituted of two detection contacts and one common contact.

Reference numeral 317 denotes a fixed contact which belongs to the right contact and which is specifically constituted of the common contact section 313 (and a portion of common contact 321), the detection contact section 314 (and a portion of detection contact 324), and the detection contact section 316 (and a portion of detection contact 326). In other words, as in the case of the fixed contact 307, the fixed contact 317 is constituted of two detection contacts and one common contact.

In the switch contact configured as described above, the common contact 321 and the detection contacts 324 and 325 belonging to the fixed contact 307 are made conductive when the movable contact 301 is pressed by a user's operation, and made nonconductive when it is not pressed. Similarly, the common contact 321 and the detection contacts 324 and 326 belonging to the fixed contact 317 are made conductive when the movable contact 311 is pressed by a user's operation, and made nonconductive when it is not pressed.

Figure 4:
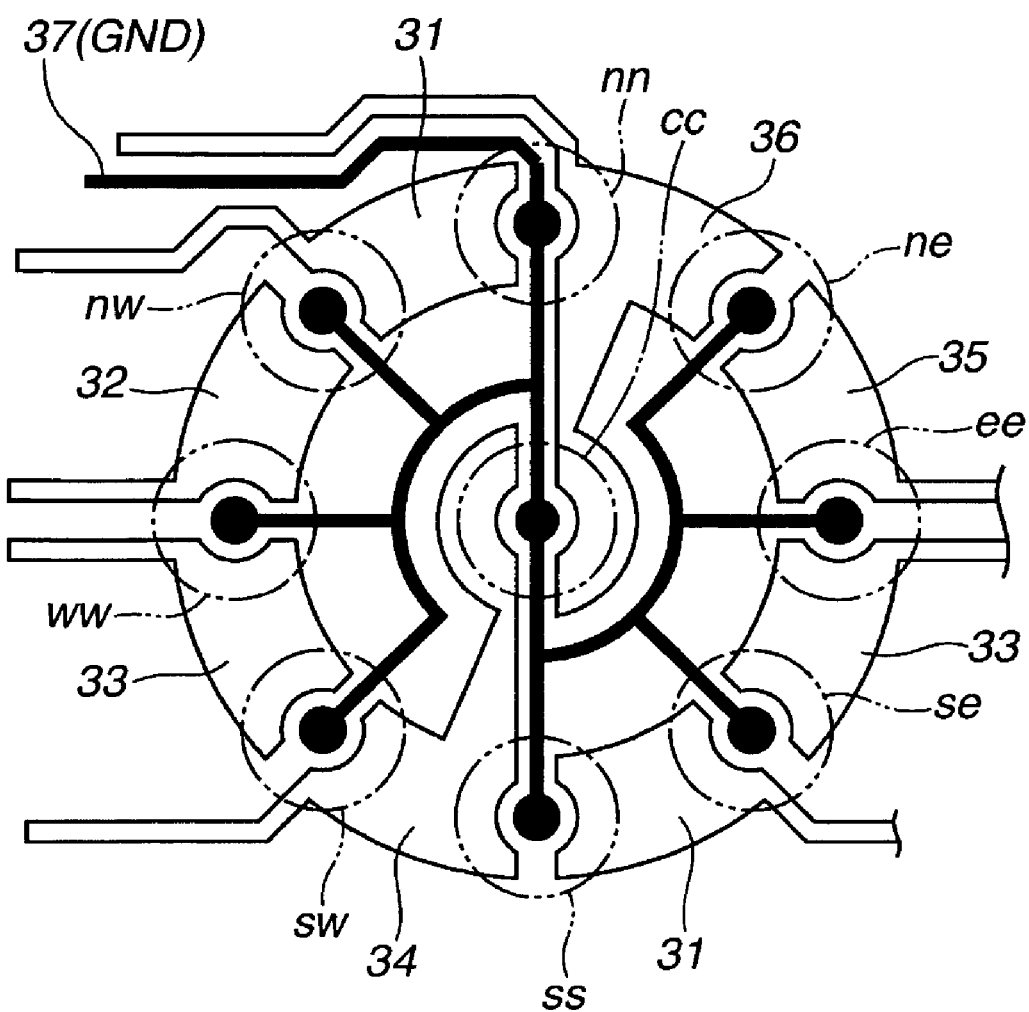
FIG. 4 is a diagram showing a signal detection pattern formed on a flexible printed circuit board according to at least one exemplary embodiment.

FIG. 4 is an explanatory diagram showing a signal detection pattern formed on the flexible printed circuit board 22 applied to the camera example according to at least one exemplary embodiment.

Nine fixed contacts nn, ne, ee, se, ss, sw, ww, nw, and cc correspond to the movable contacts of the direction selection member 21, indicating an upper part (north), an upper right (north east), a right (east), a lower right (south east), a lower part (south), a lower left (south west), a left (west), an upper left (north west), and a center in order (clockwise) Reference numerals 31 to 36 denote independent detection contacts (signal lines). The schematic diagram of FIG. 3 illustrates the detection contact sections belonging to a simpler fixed contact than shown in FIG. 4. Furthermore, a plurality of detection contacts denoted by identical reference numerals are shown. In at least one exemplary embodiment, however, the detection contacts denoted by the identical reference numerals can be connected together (e.g., the backside of the flexible printed circuit board 22). Specifically, the detection contact 31 is a common detection contact belonging to four fixed contacts nn, nw, se, and ss, and the detection contact 33 is a common detection contact belonging to four fixed contacts ee, se, sw and ww (e.g., connected through the backside of the flexible printed circuit board 22).

Reference numeral 37 denotes a common contact (GND line). The common contact 37 is formed by interconnecting the common contact sections belonging to the nine fixed contacts. The detection contacts 31 to 36 and the common contact 37 are connected to the control circuit 200.

With respect to the fixed contacts, the detection contacts are arranged in combinations of nn (31, 36), ne (36, 35), ee (35, 33), se (33, 31), ss (31, 34), sw (34, 33), ww (33, 32), nw (32, 31), and cc (34, 36) in order from the fixed contact nn (clockwise), (e.g., a combination of two detection contacts for one fixed contact).

Furthermore, a combination of detection contacts for each fixed contact can be arranged to always share one detection contact with a combination of detection contacts arranged for the adjacent fixed contact. For example, the fixed contacts nn and ne can share the detection contact 36. Similarly, the fixed contacts ne and ee can share the detection contact 35, and similar relations are set for other fixed contact positions. This arrangement enables efficient wiring without complicating the arranging configuration of the wiring patterns.

Figure 5:
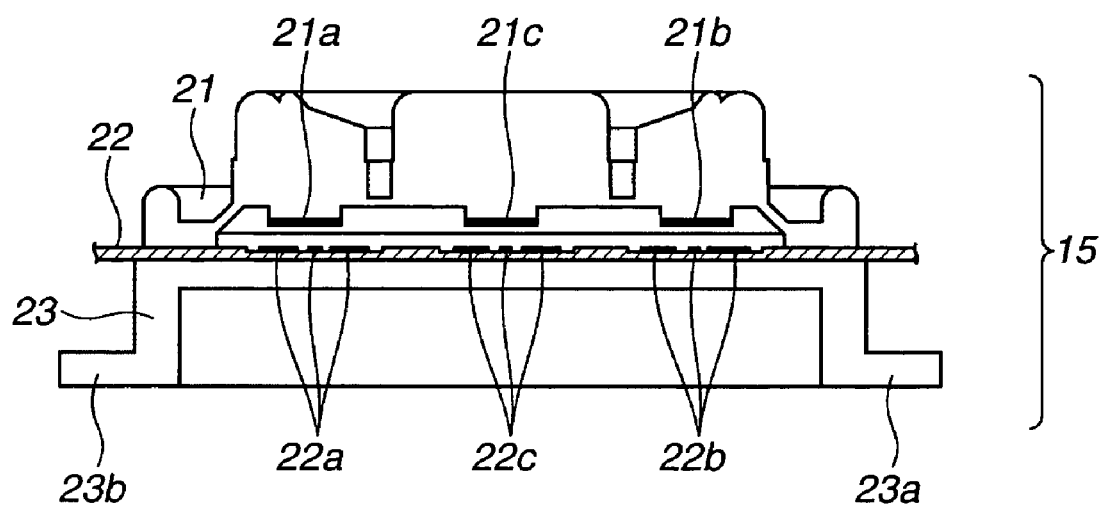
FIG. 5 is a sectional diagram showing the direction selector according to at least one exemplary embodiment.

FIG. 5 is a sectional diagram of the direction selector 15. Reference numeral 21 denotes a direction selection member. Reference numeral 22 denotes a flexible printed circuit board, and reference numeral 23 denotes a pedestal. The flexible printed circuit board 22 is fixed to the pedestal 23, and the direction selection member 21 is arranged on the flexible printed circuit board 22.

Reference numerals 21*a*, 21*b*, and 21*c* denote movable contacts, which can be moved independently, in response to a pressing operation, back and forth between a conductive position (contact position) and a retreating position (noncontact position). The adjacent two of these movable contacts are arranged to contact with at least one and the same detection contact.

Reference numerals 22*a*, 22*b*, and 22*c* denote fixed contacts disposed on the flexile printed circuit board 22. Each fixed contact includes one common contact and two detection contacts. The fixed contacts 22*a*, 22*b*, and 22*c* can contact with the movable contacts 21*a*, 21*b*, and 21*c*, respectively, to be made electrically conductive. These fixed contacts 22*a*, 22*b* and 22*d* can be constituted of the conductive patterns shown in FIG. 4.

Figure 6:
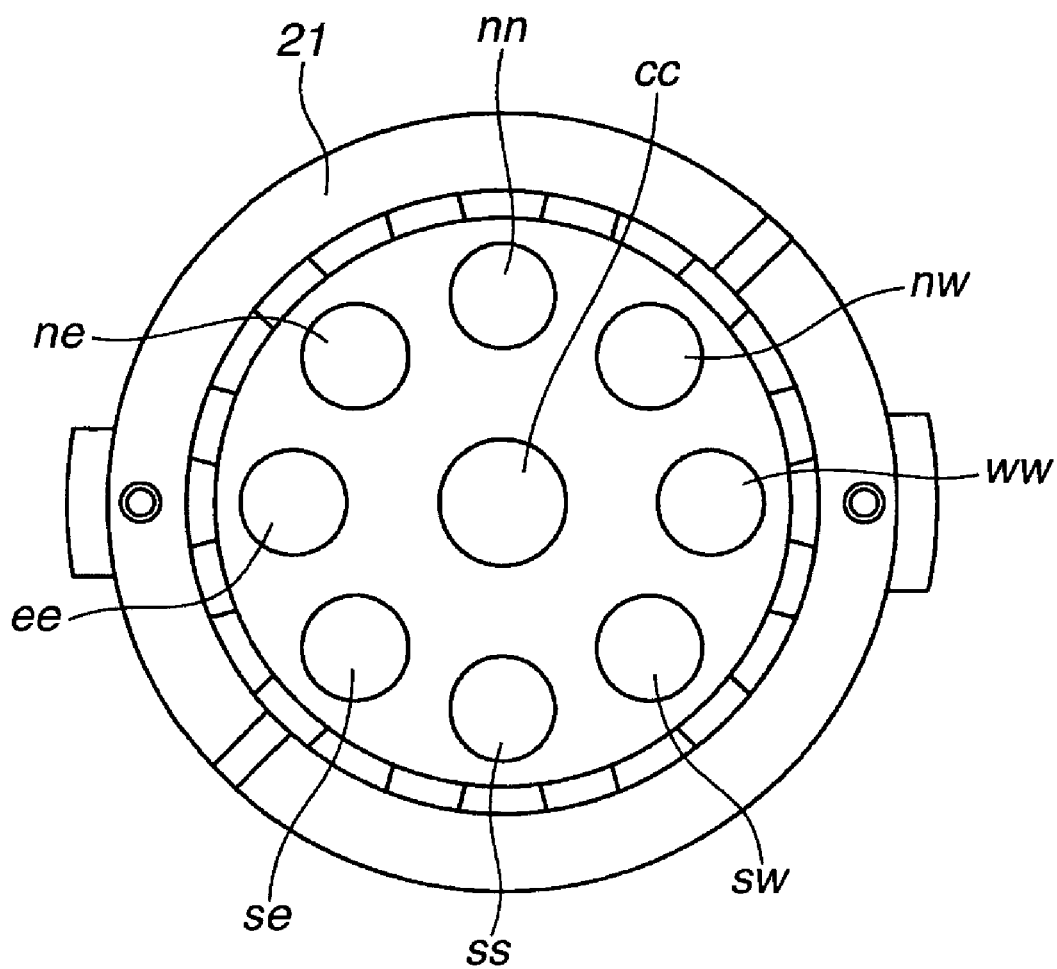
FIG. 6 is a diagram showing the direction selector as viewed from a movable contact side according to at least one exemplary embodiment.

FIG. 6 shows the direction selection member 21 as viewed from the movable contact side (backside). The movable contact cc is arranged in the center, and the movable contacts nn, nw, ww, sw, ss, se, ee, and ne are arranged in the outer periphery clockwise from above. The surface of each movable contact is coated with an electrically conductive substance (e.g., carbon).

Signal detection executed by the control circuit 200 is summarized as follows.

When the user presses the operation member to bring the corresponding movable contact into contact with the fixed contact nn, the detection contacts 31 and 36 and the common contact 37 are made conductive. Accordingly, these contacts are set to the same potential (GND), and the control circuit 200 detects this setting to determine the operation of the operation member NN.

Similarly, the detection contacts 36 and 35 and the common contact 37 are made conductive when the operation member NE is pressed. The detection contacts 35 and 33 and the common contact 37 are made conductive when the operation member EE is pressed. The detection contacts 33 and 31 and the common contact 37 are made conductive when the operation member SE is pressed. The detection contacts 31 and 34 and the common contact 37 are made conductive when the operation member SS is pressed. The detection contacts 34 and 33 and the common contact 37 are made conductive when the operation member SW is pressed. The detection contacts 33 and 32 and the common contact 37 are made conducive when the operation member WW is pressed. The detection contacts 32 and 31 and the common contact 37 are made conductive when the operation member NW is pressed. The detection contacts 36 and 34 and the common contact 37 are made conductive when the operation member CC is pressed. Accordingly, the control circuit 200 detects such conduction (the same potential) to determine the operation of each operation member.

According to at least one exemplary embodiment, when the two detection contacts are simultaneously set to ground (GND), the operation of the operation member is determined. Conversely, however, for example, when only one detection contact is set to GND by improperly pressing the operation member, an error can be determined and processing can be carried out understanding that no operation member has been pressed. Furthermore, for example, when three or more detection contacts are simultaneously set to GND by pressing the two operation members simultaneously, an error can also be determined and processed. With such processing, an erroneous operation of the electronic apparatus can be reduced.

The theory of setting a switch detection signal according to at least one exemplary embodiment will be described next. The maximum settable number T of switch contacts is represented by the following equation (1):

$$T = {}_nC_r \tag{1}$$

where n is the total number of detection contacts, and r is the number of detection contacts belonging to one fixed contact (the number of detection contacts belonging to each of all the fixed contacts is r, not different from one to the other). T is the number of combinations obtained by taking out r from n. The control circuit 200 determines that a corresponding switch contact has been operated by the user when all of the detection contacts r belonging to one fixed contact are made conductive with the common contact to be simultaneously set to GND.

For example, the exemplary embodiment shown in FIG. 4 includes detection contacts 31 to 36, the total number n of detection contacts is 6. As the number of detection contacts belonging to one fixed contact is 2, r=2 is established. Thus, the maximum settable number T of switch contacts becomes $_6C_2$ based on the equation (1). This is calculated as follows:

$$T = {}_6C_2 = 6!/((6-2)! \cdot 2!) = 15 \tag{2}$$

The maximum settable number of switch contacts is 15 with respect to the total number of detection contacts "6."

Generally, the number of detection contacts are as many as the set number of switch contacts. Thus, for example, when fifteen switch contacts are prepared, fifteen detection contacts are necessary. However, in the above example of at least one exemplary embodiment, only six detection contacts are necessary. As a result, signal detection can be carried out with the smaller number of detection contacts.

According to the example of at least one exemplary embodiment, nine switch contacts are set for direction selection. In theory, however, six more switches (e.g., 15 (from equation (2))−9 switch contacts=6) can be set, and thus these can be assigned to another switch group such as the switch group 19*b*. Needless to say, the six extra switches can be left as they are without being used. Thus, six detection contacts can be used instead of the conventional nine detection contacts. According to at least one exemplary embodiment, the number of detection contacts belonging to one fixed contact is r=2. However, if possible in terms of the structure of a contact, r=3 or more can be set, and a set range of r only needs to be a natural number of $2 \leq r \leq n-1$.

Figure 7:
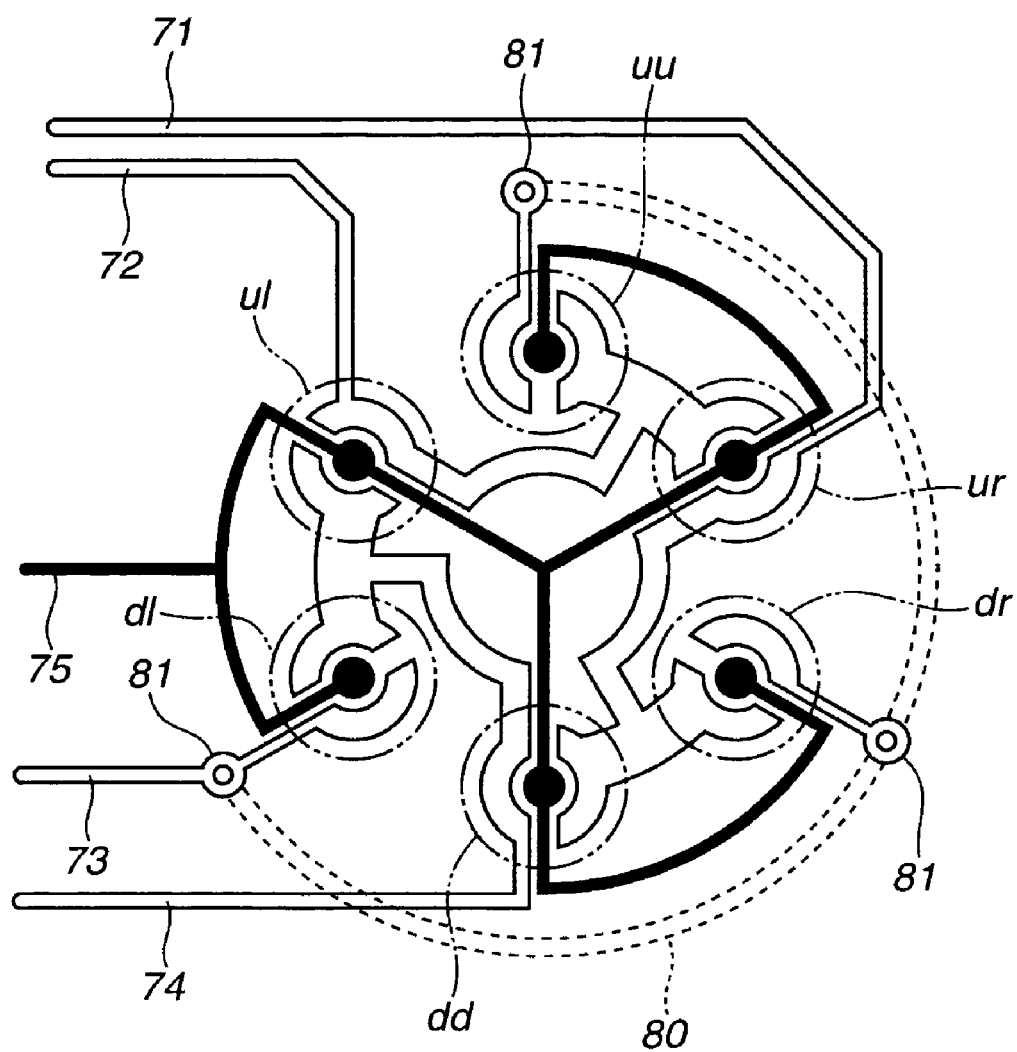
FIG. 7 is an explanatory diagram showing an example in which a minimum number of detection contacts are disposed according to at least one exemplary embodiment.

Next, FIG. 7, illustrates an example where the minimum number of detection contacts is set with respect to the number of switch contacts intended to be arranged. FIG. 7 illustrates a signal detection pattern formed on the flexile printed circuit board.

Six-direction switches of an upper part, an upper right, a lower right, a lower part, a lower left, and an upper left are assumed as necessary operation members. In other words, the number of switch contacts is T=6. Fixed contacts uu, ur, dr, dd, dl, and ul are disposed corresponding to the respective switch contacts, and the number of detection contacts belonging to one fixed contact is r=2.

Then, as n=4 is derived from the equation (1), it can be understood that the minimum necessary number of detection contacts is 4. When four detection contacts and a common contact are wired based on this result, a wiring pattern shown in FIG. 7 can be obtained. Note that various shaped contacts can be used and different contacts can be linked (e.g., via 81).

The number of detection contacts in this example is 4, including detection contacts 71 to 74. The detection contact 71 belongs to three fixed contacts ur, dr, and dd. The detection contact 72 belongs to three fixed contacts ul, uu, and ur. The detection contact 73 belongs to three fixed contacts uu, dr, and dl. The detection contact 74 belongs to three fixed contacts dd, dl, and ul. The backside of the flexible printed circuit board is used for wiring, and a portion 80 represented by a broken line is wired to the backside. Reference numeral 81 denotes a through-hole for interconnecting the wiring lines of the surface and the backside.

A common contact (GND) 75 is wired to belong to all of the fixed contacts.

With such wiring, a control circuit (not shown) determines an operation of an upper (uu) direction when the detection contacts 73 and 72 and the common contact 75 are made conductive. Similarly, the control circuit determines an operation of an upper right (ur) when the detection contacts 72 and 71 and the common contact 75 are made conductive. The control circuit determines an operation of a lower right (dr) when the detection contacts 73 and 71 and the common contact 75 are made conductive. The control circuit determines an operation of a lower part (dd) when the detection contacts 71 and 74 and the common contact 75 are made conductive. The control circuit determines an operation of a lower left (dl) when the detection contacts 73 and 74 and the common contact 75 are made conductive. The control circuit determines an operation of an upper left (ul) when the detection contacts 74 and 72 and the common contact 75 are made conductive.

According to this example, as n can be obtained as a natural number with respect to T and r, the wiring is enabled without setting any useless detection contacts. However, when the number of switch contacts is 9, eight directions and the center (T=9), and the number of detection contacts belonging to one fixed contact is 2 (r=2) as in the case of the example of the exemplary embodiment, n cannot be obtained as a natural number from the equation (1). In this case, if a minimum natural number n that satisfies the following inequality is set, wiring can be carried out with fewer wastes.

$$T < {}_nC_r \quad (3)$$

When T=9 and r=2 are decided as in the case of at least one exemplary embodiment, n=5 can be obtained. As ${}_5C_2=10$ is established, one switch contact remains unused with respect to the maximum settable number of switch contacts.

Next, an example of a function of the aforementioned direction selector 15 in the camera will be described.

Figure 8:
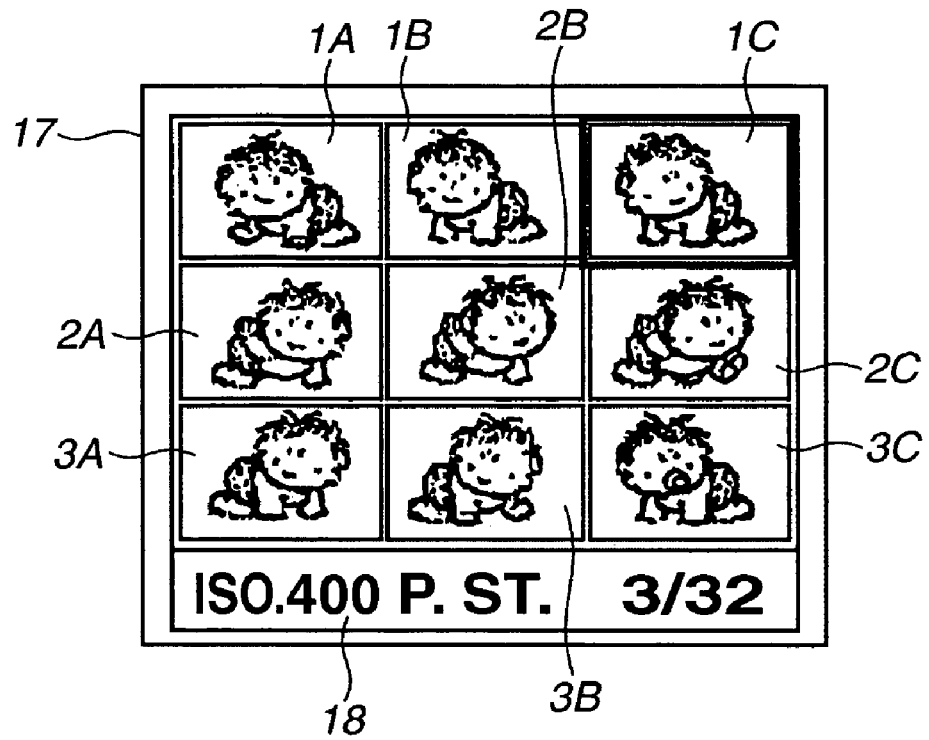
FIG. 8 is a diagram showing monitor display contents of a camera and display contents of an image information display section according to at least one exemplary embodiment.
Figure 9:
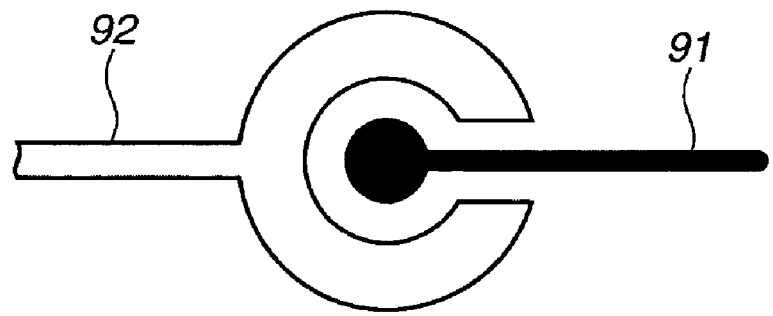
FIG. 9 is a diagram showing a conventional switch detection pattern.
Figure 10:
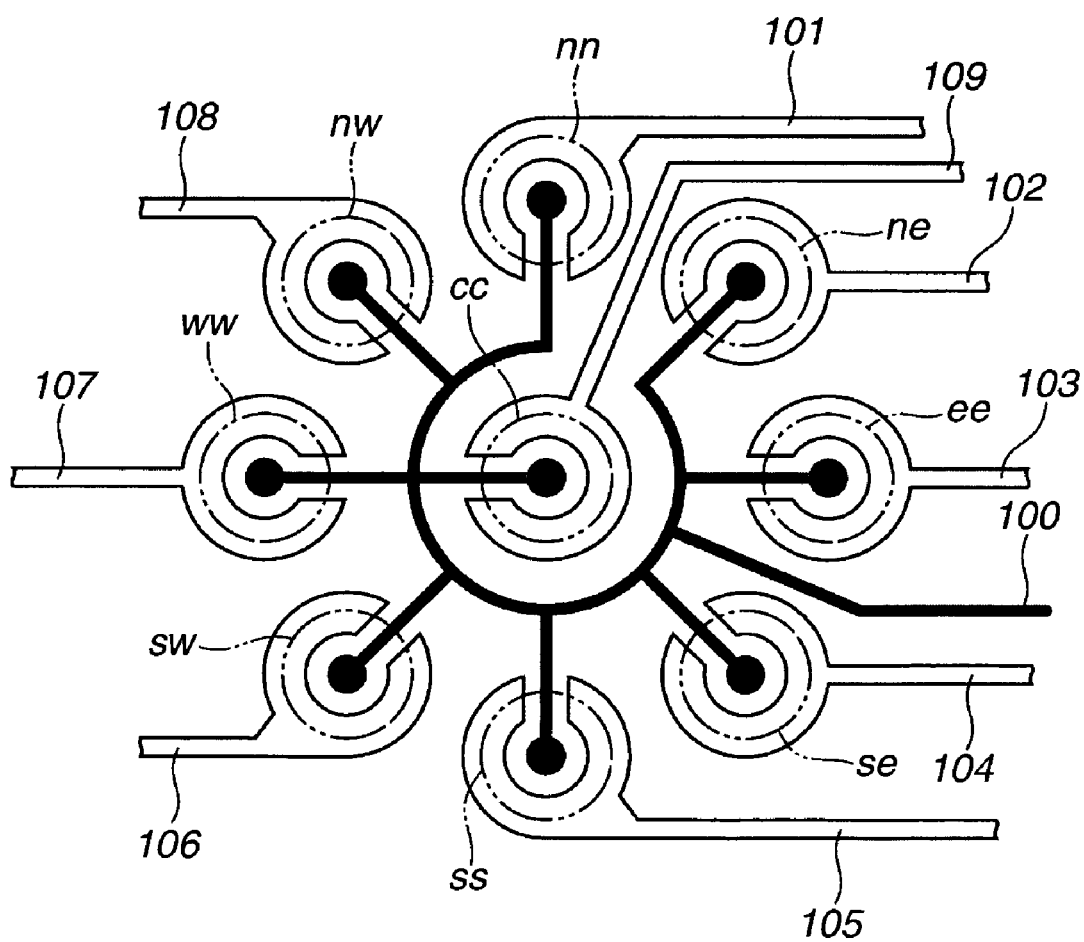
FIG. 10 is a diagram showing a detection pattern of a conventional direction selector.
Figure 11:
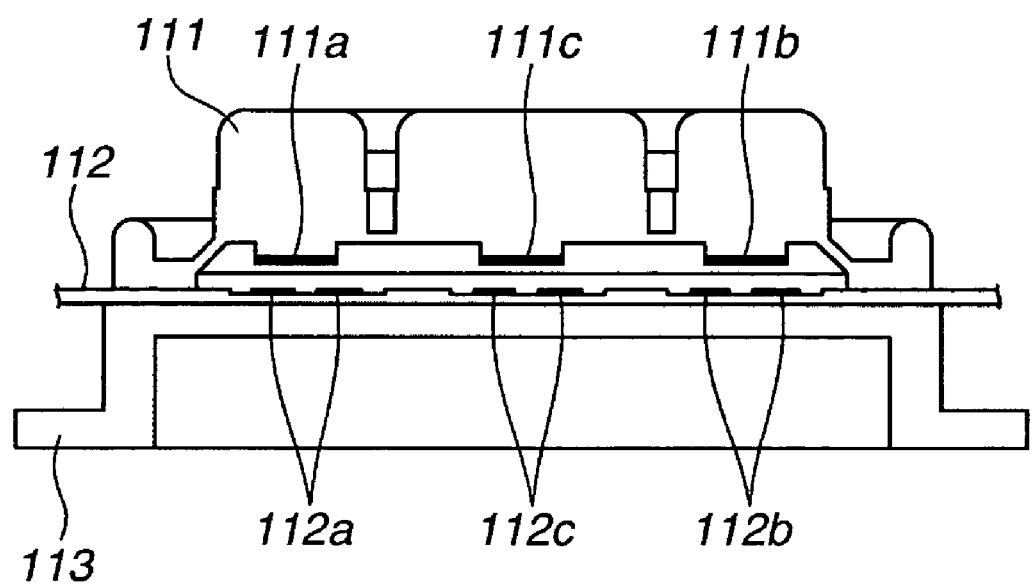
FIG. 11 is a sectional diagram showing the conventional direction selector.
Figure 12:
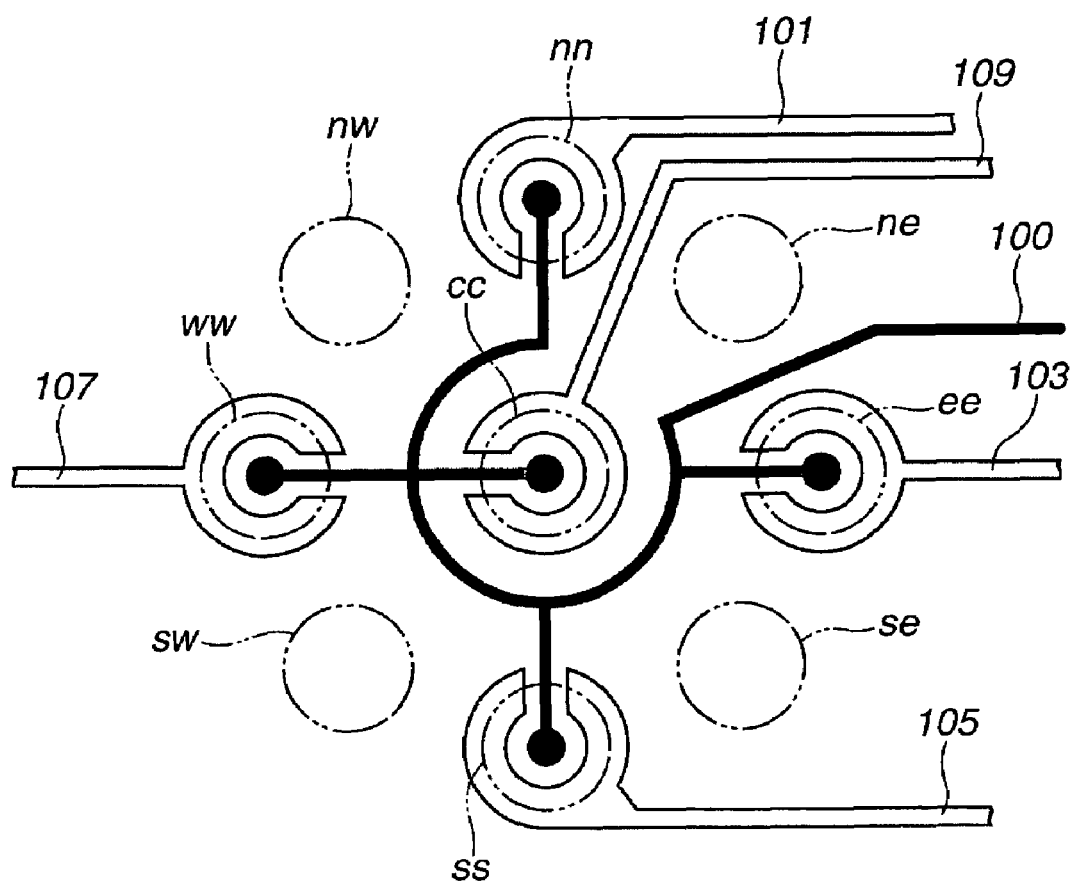
FIG. 12 is a diagram showing a detection pattern of another conventional direction selector.

FIG. 8 shows an index image displayed on the monitor 17 of the camera and image information displayed on the image information display section 18. In FIG. 8, screen coordinate positions 1A to 3C indicate index image display positions. In the screen coordinate positions 1A to 3C, nine frame images are index-displayed as thumbnail images. A thumbnail image 1C, whose frame is displayed thick, among the nine frame images is a frame image as selected by the user. The image information display section 18 displays information of image data regarding the selected thumbnail image 1C.

For example, in the case of selecting a thumbnail image 2B instead of the thumbnail image 1C displayed with a thick frame, when the user presses the operation member SW (south west), the control circuit 200 of the camera detects the user's operation, moves the thick frame to the screen coordinate position 2B to indicate the movement of a target image to the thumbnail image 2B, and displays information of image data regarding the thumbnail image 2B on the image information display section 18.

Figure 13:
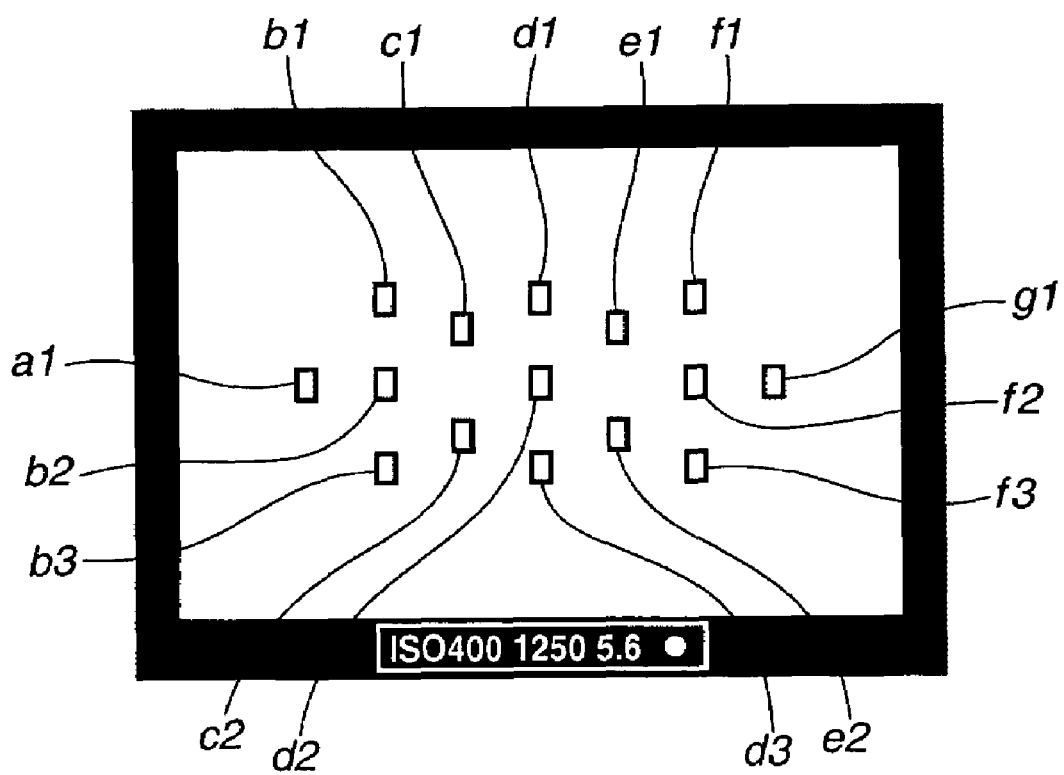
FIG. 13 is a diagram showing a conventional finder screen.

Thus, during image reproduction, the direction selector 15 can be used to select a thumbnail image displayed on the monitor 17. During photography, the direction selector 15 can be used to make direct selection when an indicator of a focusing point described above with reference to FIG. 13 is selected.

At least one exemplary embodiment has been described by way of a case where the direction selector is applied to a camera. However, similar effects can be provided even when the direction selector is applied to another electronic apparatus. The exemplary embodiment has been described as a direction selector in which switch contacts are annularly arranged. However, exemplary embodiments are not limited to this arrangement. For example, at least one exemplary embodiment can be applied to a plurality of switch contacts arranged in a matrix.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2005-010715 filed Jan. 18, 2005, which is hereby incorporated by reference herein in its entirety.

What is claimed is:

1. An electronic apparatus having a plurality of switch contacts and performing an operation in accordance with a switch signal from one of the plurality of the switch contacts, the electronic apparatus comprising:
a control unit configured to control operation of the electronic apparatus in accordance with the switch signal,
the switch contact comprising:
a detection contact;
a common contact shared by all of the plurality of the switch contacts; and
a movable contact making the detection contact and the common contact conductive by a user operation,
wherein at least one of the plurality of switch contacts includes a plurality of the detection contacts, and each of the plurality of the detection contacts belonging to the at least one switch contact is shared by different other switch contacts, respectively, and at least one switch contact having the plurality of the detection contacts shares at least one of the detection contacts within the plurality of the detection contacts belonging to the switch contact, with a switch contact which does not lie adjacent to the switch contact and,
wherein the control unit controls operation of the electronic apparatus in accordance with a switch signal from a switch contact among the plurality of the switch contacts, if all of the detection contacts belonging to the switch contact are made conductive with the common contact.

2. The electronic apparatus according to claim 1, wherein the plurality of switch contacts are annularly arranged.

3. The electronic apparatus according to claim 1, wherein the total number of detection contacts is a natural number n greater than or equal to 3, the number of detection contacts belonging to each switch contact is a natural number r greater than or equal to 2 and less than n, and the number of switch contacts is less than or equal to a number represented by ${}_nC_r$, and wherein the control unit is configured to operate in accordance with an independent switch signal from each switch contact.

4. The electronic apparatus according to claim 1, wherein a minimum natural number n satisfying $T \leq {}_nC_r$ is the total number of detection contacts, where T represents the number of switch contacts, and the number of detection contacts belonging to each switch contact is a natural number r greater than or equal to 2 and less than the natural number n, and wherein the control unit is configured to operate in accordance with an independent switch signal from each switch contact.

5. The electronic apparatus according to claim 1, wherein the plurality of detection contacts are arranged to face one another across the common contact.

6. The electronic apparatus according to claim 1, wherein the control unit does not control operation of the electronic apparatus in accordance with the switch signal, if all of detection contacts belonging to each of at least two switch contacts among the plurality of switch contacts are made conductive with the common contact.

* * * * *